United States Patent
Purcell et al.

(10) Patent No.: US 8,504,400 B2
(45) Date of Patent: Aug. 6, 2013

(54) DYNAMICALLY OPTIMIZED DISTRIBUTED CLOUD COMPUTING-BASED BUSINESS PROCESS MANAGEMENT (BPM) SYSTEM

(75) Inventors: Joshua L. Purcell, Dallas, TX (US); Tassanee K. Supakkul, Euless, TX (US); Mathews Thomas, Flower Mound, TX (US); Julio Wong, Pembroke Pines, FL (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 12/730,962

(22) Filed: Mar. 24, 2010

(65) Prior Publication Data
US 2011/0238458 A1 Sep. 29, 2011

(51) Int. Cl.
*G06Q 10/00* (2012.01)
(52) U.S. Cl.
USPC .......................... 705/7.11; 705/7.27
(58) Field of Classification Search
None
See application file for complete search history.

(56) References Cited

U.S. PATENT DOCUMENTS

| | | | |
|---|---|---|---|
| 6,434,568 B1 * | 8/2002 | Bowman-Amuah | 1/1 |
| 6,594,355 B1 * | 7/2003 | Deo et al. | 379/219 |
| 6,938,021 B2 * | 8/2005 | Shear et al. | 705/67 |
| 7,380,039 B2 * | 5/2008 | Miloushev et al. | 710/244 |
| 7,574,496 B2 * | 8/2009 | McCrory et al. | 709/223 |
| 7,596,620 B1 * | 9/2009 | Colton et al. | 709/226 |
| 7,730,119 B2 * | 6/2010 | Bates et al. | 709/201 |
| 7,934,035 B2 * | 4/2011 | Miloushev et al. | 710/244 |
| 8,014,308 B2 * | 9/2011 | Gates, III et al. | 370/252 |
| 2003/0033238 A1 * | 2/2003 | Oskielunas et al. | 705/37 |
| 2003/0105810 A1 * | 6/2003 | McCrory et al. | 709/203 |
| 2005/0246215 A1 * | 11/2005 | Rackham | 705/7 |
| 2006/0036719 A1 * | 2/2006 | Bodin et al. | 709/223 |
| 2006/0143350 A1 * | 6/2006 | Miloushev et al. | 710/242 |
| 2006/0165040 A1 * | 7/2006 | Rathod et al. | 370/335 |
| 2007/0005522 A1 * | 1/2007 | Wren | 706/13 |
| 2008/0004922 A1 * | 1/2008 | Eder | 705/7 |
| 2008/0021987 A1 * | 1/2008 | Bates et al. | 709/223 |
| 2008/0071588 A1 * | 3/2008 | Eder | 705/7 |

(Continued)

OTHER PUBLICATIONS

Foley, J., "Video: How to Plug Into the Cloud," [online] InformationWeek, Plug Into the Cloud, Dec. 10, 2008 [retrieved Mar. 24, 2010] retrieved from the Internet: <http://www.informationweek.com/cloud-computing/blog/archives/2008/12/video_how_to_ge.html?queryText=how+to+plug+into+the+cloud>.

(Continued)

*Primary Examiner* — Brett Feeney
(74) *Attorney, Agent, or Firm* — Patents On Demand P.A.; Brian K. Buchheit; Scott M. Garrett

(57) ABSTRACT

A workflow server can receive requests, each for a business process workflow conforming to a business process model. Each business process workflow can include a set of interdependent tasks. The workflow server can satisfy received requests by assigning tasks to different service providers that provide software services. Each of the tasks can be assigned to corresponding ones of the software services. For each task, the workflow server can also defines an allocated cost per software service, and a time allocation per software service for completing the corresponding one of the tasks. Different service providers, including those assigned to tasks, can receive information for ones of the tasks not directly assigned to them by the workflow server. The different service providers can then bid on these tasks. Wherein when bids are won, tasks for a business process flow can be reassigned based on winning bids.

12 Claims, 5 Drawing Sheets

U.S. PATENT DOCUMENTS

| | | | |
|---|---|---|---|
| 2008/0080396 A1* | 4/2008 | Meijer et al. | 370/254 |
| 2008/0080552 A1* | 4/2008 | Gates et al. | 370/468 |
| 2008/0082667 A1* | 4/2008 | Meijer et al. | 709/226 |
| 2008/0104699 A1 | 5/2008 | Gounares et al. | |
| 2008/0147221 A1* | 6/2008 | Sukesh et al. | 700/100 |
| 2008/0172273 A1* | 7/2008 | Rackham | 705/7 |
| 2008/0319809 A1 | 12/2008 | Brown et al. | |
| 2009/0037585 A1* | 2/2009 | Miloushev et al. | 709/226 |
| 2009/0157419 A1* | 6/2009 | Bursey | 705/1 |
| 2009/0157508 A1 | 6/2009 | Illingworth et al. | |
| 2009/0171708 A1* | 7/2009 | Bobak et al. | 705/7 |
| 2009/0182955 A1 | 7/2009 | Cherukuri | |
| 2009/0193440 A1 | 7/2009 | Arthursson et al. | |
| 2009/0216884 A1 | 8/2009 | Larvet | |
| 2009/0228967 A1 | 9/2009 | Gbadegesin et al. | |
| 2009/0276771 A1* | 11/2009 | Nickolov et al. | 717/177 |
| 2009/0300635 A1* | 12/2009 | Ferris | 718/104 |
| 2010/0042720 A1* | 2/2010 | Stienhans et al. | 709/226 |
| 2010/0050172 A1* | 2/2010 | Ferris | 718/1 |
| 2010/0064033 A1* | 3/2010 | Travostino et al. | 709/220 |
| 2010/0070946 A1* | 3/2010 | Herrmann et al. | 717/102 |
| 2010/0076856 A1* | 3/2010 | Mullins | 705/26 |
| 2010/0114656 A1* | 5/2010 | Travostino | 705/10 |
| 2010/0125664 A1* | 5/2010 | Hadar et al. | 709/224 |
| 2010/0257009 A1* | 10/2010 | Liu et al. | 705/8 |
| 2010/0268764 A1* | 10/2010 | Wee et al. | 709/203 |
| 2010/0332262 A1* | 12/2010 | Horvitz et al. | 705/4 |
| 2010/0332373 A1* | 12/2010 | Crabtree et al. | 705/37 |
| 2010/0332479 A1* | 12/2010 | Prahlad et al. | 707/741 |
| 2011/0016214 A1* | 1/2011 | Jackson | 709/226 |
| 2011/0029882 A1* | 2/2011 | Jaisinghani | 715/736 |
| 2011/0029981 A1* | 2/2011 | Jaisinghani | 718/104 |
| 2011/0126197 A1* | 5/2011 | Larsen et al. | 718/1 |
| 2011/0131329 A1* | 6/2011 | Kaplinger et al. | 709/226 |
| 2011/0131335 A1* | 6/2011 | Spaltro et al. | 709/228 |
| 2011/0138050 A1* | 6/2011 | Dawson et al. | 709/226 |
| 2011/0145094 A1* | 6/2011 | Dawson et al. | 705/26.63 |
| 2011/0153727 A1* | 6/2011 | Li | 709/203 |
| 2011/0161076 A1* | 6/2011 | Davis et al. | 704/231 |
| 2011/0184816 A1* | 7/2011 | Jones et al. | 705/14.71 |
| 2011/0202927 A1* | 8/2011 | Miloushev et al. | 718/104 |
| 2011/0213691 A1* | 9/2011 | Ferris et al. | 705/37 |
| 2011/0225584 A1* | 9/2011 | Andrade et al. | 718/100 |

OTHER PUBLICATIONS

Cao, et al., "An optimized algorithm for task scheduling based on activity based costing in cloud computing," IEEE 3rd Int'l Conf. on Bioinformatics and Biomedical Engineering (iCBBE 2009), Jun. 2009.

* cited by examiner under the premise that the computing components/resources utilized by the workflow are fixed or static. For example, when a workflow utilizes computing components/resources from other systems that are internal to the organization's enterprise computing network.

DYNAMICALLY OPTIMIZED DISTRIBUTED CLOUD COMPUTING-BASED BUSINESS PROCESS MANAGEMENT (BPM) SYSTEM

BACKGROUND

The present invention relates to the field of business process management (BPM) systems and, more particularly, to a dynamically optimized distributed cloud computing-based BPM system.

Business process management (BPM) systems orchestrate the performance of the tasks that make up a workflow by various computing components and/or resources. Many conventional BPM systems operate under the premise that the computing components/resources utilized by the workflow are fixed or static. For example, when a workflow utilizes computing components/resources from other systems that are internal to the organization's enterprise computing network.

Many organizations are beginning to restructure their computing networks to incorporate a paradigm shift to a cloud computing environment and business models. In a cloud computing paradigm, cloud computing service providers utilize the Internet to provide computing resources and/or services to consumers in a service-oriented delivery model. For example, a business may utilize a third-party such as GOOGLE to provide email services instead of purchasing all the resources necessary to implement an email system in-house.

Use of a conventional BPM system 110 with a cloud computing environment 130, as shown in FIG. 1, illustrates some of the obstacles encountered with such a configuration. Initially, system 100 incurs additional overhead because the workflow engine 120 is unable to operate in a distributed fashion within the cloud computing environment 130. When the requestor 105 initiates 152 the performance of a workflow 125, the workflow engine 120 acts similar to a switchboard operator—retrieving 154 the workflow 125, sending 156 Step 1 data to cloud service 1 135, receiving 158 Output 1 from cloud service 1 135, sending 160 the Step 2 data and Output 1 to cloud service 2 140, and receiving 162 the final Output 2.

The larger the quantity/size of the data being exchanged between the workflow server 115 and the cloud services 135 and 140, the more time and/or bandwidth is required to perform the data transfers. This situation is further compounded when subsequent processing requires the output of a previous step, as shown in system 100. Since cloud service 2 140 requires Output 1 from cloud service 1 135, Output 1 must be sent 158 to the workflow server 115, which then passes 160 the Output 1 to cloud service 2 140.

Current approaches attempt to distribute the workflow 125 across different workflow engines 120. However, such an approach requires additional coordination among the workflow engines 120 as well as key business structures (i.e., service-level agreements) to adjudicate the transactions. In other words, use of multiple engines 120 alone does not avoid potential breakdown of the business process if a given subflow in a workflow cannot fulfill a given request or if performance is very slow.

Additionally, the workflow 125, typically written in a business process execution language (BPEL), is constructed using static conditions. That is, a provider and/or service are explicitly specified for each workflow step 127. This leads to a two-fold problem. Identifiers (e.g., Web site names and addresses) tend to be fluid in the dynamic cloud computing environment 130, which is problematic for applications and/or documents that statically encode a service identifier.

Further, the BPM system 110 does not take advantage of potential efficiencies and/or cost-savings afforded by the economy within the cloud computing environment. That is, the workflow engine 120 will always use cloud service 1 135 to perform step 1 127 even if time and/or money could be saved by using another service provider.

BRIEF SUMMARY

The disclosure addresses problems with managing business processes within a cloud computing environment. Business processes can be a collection of related, structured activities that produce a service or product that meets the needs of a customer. A business process work flow is designed to increase visibility of business processes, which execute across computing systems, which can belong to different companies and/or divisions. That is, there is a layer of abstraction for business process workflows, which cause these workflows to be defined and implemented above a hardware layer. To achieve this abstraction, special business process flow languages, similar to the business process execution language (BPEL), are used to construct business process flows. A cloud computing environment is one in which services are provided where the services are abstracted from the underlying hardware that implements them. Both business process workflows conforming to a business process model and cloud computing environments can be implemented in a service oriented architecture environment.

The cloud computing environment in which business processes execute can be a true distributed environment, as opposed to a centralized one. That is, various components (and services) of the cloud computing environment can execute independent of each other with no direct communication or other positive knowledge existing between the computing equipment that provides the different services. Thus, each of the services executing in the cloud computing environment can lack knowledge pertaining to other ones of the services. In the disclosure, individual workflow engines can publish workflow task(s). Services in the cloud computing environment can post bids for executing a workflow or parts thereof with a cloud registry. Based on these bids, individual workflow engines, which are in charge of deciding which workflow task(s) is/are handled by which service providers, can assign workflow task(s) to the cloud services.

One embodiment of this disclosure implements a cloud registry server and cloud workflow manager, which are implemented at the cloud computing environment level and which closely interact with a BPM workflow server. The cloud registry server and cloud workflow manager are able to look at BPM workflow activities as complex business processes that must be executed as efficiently as possible within a cloud computing environment. This is to be contrasted with a traditional viewpoint that each activity or process of a workflow is discrete and is to be handled independently (from a hardware/optimization perspective) of other workflow processes. Concepts, such as cloud BPEL, cloud registries, and dynamic modifications of workflows within a cloud environment, are important to implementing the innovations detailed herein. In one embodiment, a facility is included in which service providers, which include providers of cloud services, can competitively bid for one or more jobs in a BPM workflow.

The disclosure can be implemented in accordance with numerous aspects and embodiments. For example, one aspect of the disclosure can include a system for handling business process flows in a cloud computing environment. In the system, a workflow server can receive requests, each for a business process workflow conforming to a business process model. Each business process workflow can include a set of interdependent tasks. The workflow server can satisfy received requests by assigning tasks to different service providers that provide software services. Each of the tasks can be assigned to a corresponding software service. For each task, the workflow server can also define an allocated cost per software service, and a time allocation per software service for completing the corresponding one of the tasks. Different service providers, including those assigned to tasks, can receive information for tasks not directly assigned to them by the workflow server. The different service providers can then bid on these upcoming tasks. When bids are won, tasks for a business process flow can be reassigned based on the winning bids. Winning bids can represent a more optimized or efficient manner of carrying out a task.

Another aspect of the disclosure relates to a method for dealing with service provider competition within business process flows. A workflow server can receive a request for a business process workflow which conforms to a business process model. The business process workflow can include a set of interdependent tasks. One or more of the interdependent tasks are executable in parallel while the others must be executed in series upon completion of earlier tasks. In response to this request, the workflow server can assign various software services and their associated providers an assignment (a task or set of interdependent tasks) depending on the capabilities of the service provider. The workflow server would also be able to establish a workflow document defining the tasks, their corresponding software services and providers, an allocated cost per software service, and a time allocation per software service for completing their corresponding assignment. At least a portion of this workflow document could be provided to the different service providers. In other words, each of the different service providers can be provided with details for other tasks that were not initially assigned to that service provider by the workflow server. Based on this information, the service providers can then bid on assignments that were not initially assigned to them if they can perform the needed task better than the estimates given in the workflow document. Responsive to the bidding, the service providers could win a bid to provide an uncompleted assignment more efficiently than indicated in the workflow document. More efficiently can mean that the uncompleted assignment will be performed in a shorter time frame, a lower cost, or both a shorter time frame and a lower cost than indicated in the workflow document. The workflow document would then be updated to reflect the change in which new service provider are assigned the future assignment based on having won at least one bid. The workflow would continue to be processed, and after each task is completed an associated workflow document would be referenced in order to appropriately move to the next task and its associated service provider.

Another aspect of the disclosure includes a method for running business processes conforming to a business process model. In the method, a workflow server can identify a business process flow comprising a set of tasks. The business process flow can conform to a business processing modeling language. The workflow server can determine a set of software services for handling various sets of tasks within the business process flow. For each of these tasks, a corresponding service can be identified, along with a time frame and cost for performing the task. Each of the services could potentially be matched to a known service provider. The workflow server, comprising one or more workflow engines, can send the different service providers a service request, which would contain information on the task being requested as well as which service provider is currently tasked with performing the service. Some portion of the service providers would potentially be able to determine a more suitable provider for some of the tasks that make up the business process flow. More suitable in this regard means that the task will be performed in a shorter time frame and/or lower cost than what was determined by the workflow server. The business process flow would be modified to substitute at least one of the tasks with a more efficient task.

Another aspect of the disclosure includes a method for dynamically optimizing and distributing performance of a cloud workflow. A cloud workflow can be registered with a cloud workflow registry in response to a workflow instantiation request. Registration can be performed by a cloud-enabled workflow engine of a distributed cloud computing business process management (BPM) system. The cloud workflow can be written in a standardized format of a business process execution language (BPEL) and it would include a set of tasks. For each of the tasks of the cloud workflow, the cloud-enabled workflow engine would determine a cloud service provider registered with the cloud workflow registry that is able to satisfy the task. The step would involve specifying information such as a cost for providing the service and a time of completion for the task satisfied by the service. The cloud workflow engine would then create an initial plan for completing the cloud workflow. The initial plan would be recorded in the cloud workflow registry and can be made available to service providers registered with the cloud workflow registry. After the initial plan is created, cloud service providers would be able to provide a bid to complete tasks more efficiently than indicated by the initial plan. The initial plan could then be modified to insert a more efficient provider for at least one of the tasks in accordance with the bids. The modified plan, the cloud service providers and cloud services indicated therein would then be utilized to complete the tasks of the cloud workflow.

DETAILED DESCRIPTION

Figure 1:
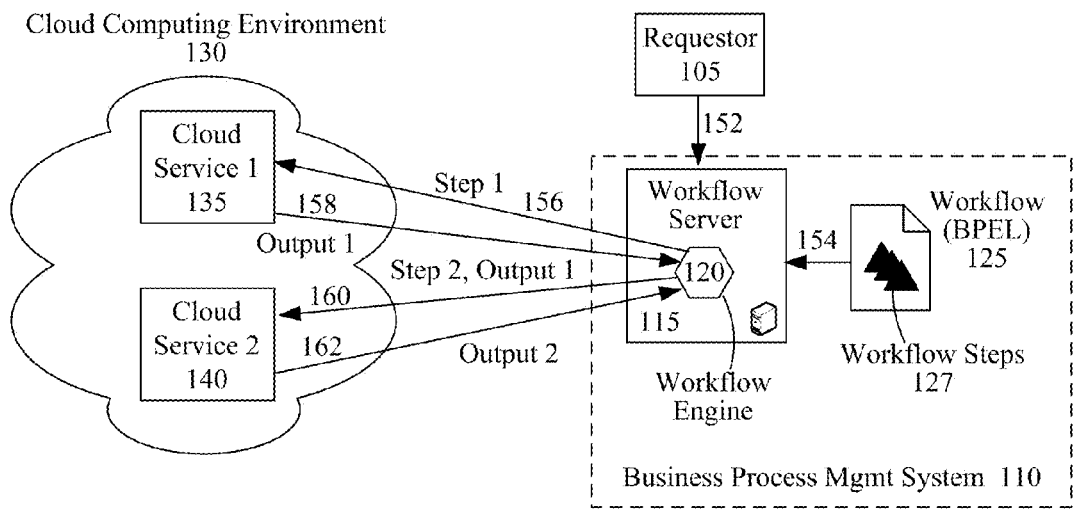
FIG. 1 (PRIOR ART) is a process flow diagram illustrating the interaction between a business process management (BPM) system and a cloud computing environment.

The present invention discloses a solution that enables the distributed performance of a cloud workflow within a cloud computing environment and the dynamic optimization of that cloud workflow based upon the current operating conditions of cloud service providers within the cloud computing environment. A cloud workflow can be a high-level representation of a standard workflow document written in a standardized cloud business process execution language (BPEL). The cloud workflow can be formatted to include acceptable limits for performance parameters similar to time and price. A cloud-enabled workflow engine can register the cloud workflow with a cloud workflow registry. A cloud workflow manager can then optimize and distribute the steps of the cloud workflow within the cloud computing environment to be performed by selected cloud service providers. When a cloud service provider is selected to perform a step of the cloud workflow, its predecessor can be instructed to deliver the output to that cloud service provider, not the BPM system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
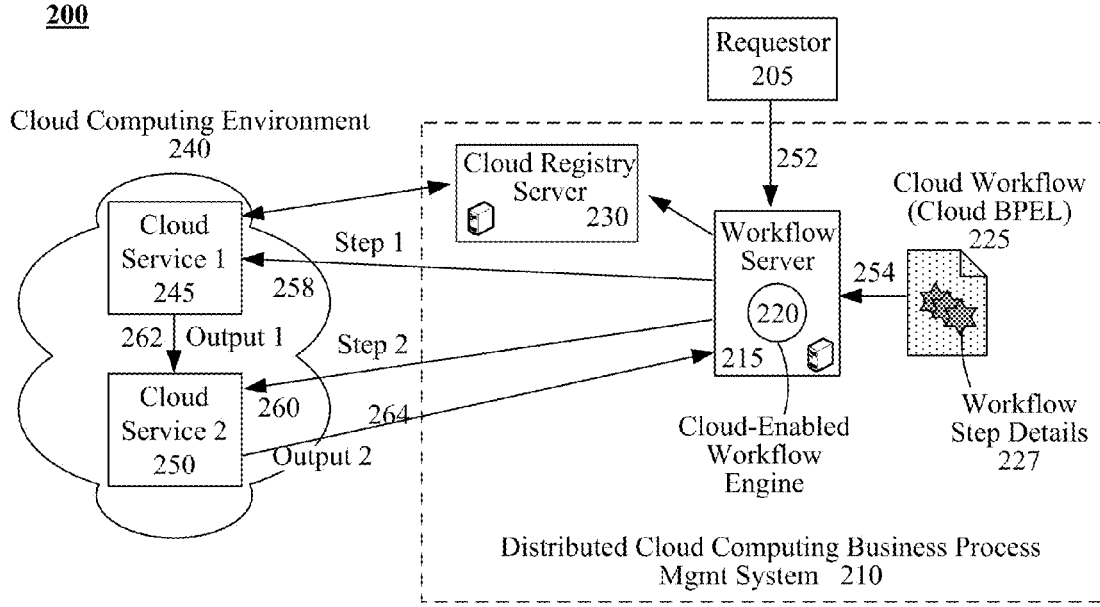
FIG. 2 is a process flow diagram illustrating the interaction between a distributed cloud computing BPM system and a cloud computing environment in accordance with an embodiment of the inventive arrangements disclosed herein.

FIG. 2 is a process flow diagram 200 illustrating the interaction between a distributed cloud computing BPM system 210 and a cloud computing environment 240 in accordance with embodiments of the inventive arrangements disclosed herein. Process flow diagram 200 can represent the performance of the workflow 125 from FIG. 1 by the distributed cloud computing BPM system 210. The cloud computing environment 240 can be a distributed environment executing services 245, 250 in a distributed, as opposed to a centralized (or even centrally managed) environment. Thus the environment 240 may be implemented as a collection of different cloud computing environments, each having environment specific requirements (e.g., one environment could conform to an AMAZON WEB SERVICES ENVIRONMENT such as the AMAZON ELASTIC COMPUTE CLOUD (EC2), another environment in the collection could conform to GOOGLE APP ENGINE standards, another to the MICROSOFT AZURE PLATFORM, etc.). The cloud computing environment 240 can include a public or external cloud, a community cloud, a hybrid cloud, and combinations thereof.

Process flow 200 can begin with a requestor 205 requesting 252 the performance of a workflow, such as workflow 125 of FIG. 1, by the distributed cloud computing BPM system 210. The distributed cloud computing BPM system 210 can include the cloud workflow server 215 and cloud registry server 230, as well as auxiliary components (not shown). The cloud-enabled workflow engine 220 operating on the workflow server 215 can retrieve 254 the cloud workflow 225 that corresponds to the request.

The cloud workflow 225 can represent an abstraction of the original workflow specifically written for performance within the cloud computing environment 240. The cloud workflow 225 can be written in a specialized cloud BPEL that can be standardized for use across various cloud service providers, services, and/or cloud-enabled workflow engines 220. Each workflow step 127 of the workflow 125 can have a corresponding workflow step detail 227 in the cloud workflow 225 that can capture information such as acceptable operating parameters.

The cloud-enabled workflow engine 220 can then register 256 the retrieved cloud workflow 225 with the cloud registry server 230. The cloud registry server 230 can be a server for a repository where one or more workflow engines 220 of workflow servers 215 can post workflow specifications (which can include a set of cloud workflow documents 225, each including workflow step details 227). Service providers can post bids for executing parts or the entire workflow. These bids can be stored in the registry, sent directly to the suitable workflow engine 220, and/or place in some other location in communication with the workflow engine 220, which is in charge of assigning tasks for workflows posted to the registry. In an alternative embodiment, the cloud registry server 230 can include a component (such as cloud workflow manager 350 of FIG. 3) able to accept bids, assign workflow tasks based on these bids, and/or oversee performance of services 245, 250 within cloud computing environment 240.

Following the same example from FIG. 1, Step 1 is to be performed by cloud service 1 245 and Step 2 by cloud service 2 250, using the output from Step 1. The cloud registry server 230 can then convey 258 the workflow step detail 227 for Step 1 to cloud service 1 245. The message sent by the cloud registry server 230 to cloud service 1 245 can also include a destination for the delivery of Output 1. This delivery destination can be established by engine 220. Alternatively, the delivery destination can be conveyed directly from the workflow engine 215 to the service 245, when an assignment for a workflow task is made.

As cloud service 1 245 performs Step 1, the workflow step detail(s) 227 for Step 2 can be sent to cloud service 2 250. The message to cloud service 2 250 can also inform the cloud service 2 250 to expect Output 1 from cloud service 1 245.

Upon completion of Step 1 by cloud service 1 245, Output 1 can be directly passed 262 to cloud service 2 250. Cloud service 2 250 can then perform Step 2 and send 264 the Output 2 back to the workflow engine 220 (or to any storage location inside or outside environment 240 as designated by the workflow engine 220).

It should be emphasized that in process flow 200, Output 1 is exchanged 262 only once from cloud service 1 245 to cloud service 2 250. This can represent a considerable savings in time and resources in comparison to process flow 100, where Output 1 must be conveyed from cloud service 1 135 to cloud service 2 140 via the workflow engine 120.

Figure 3:
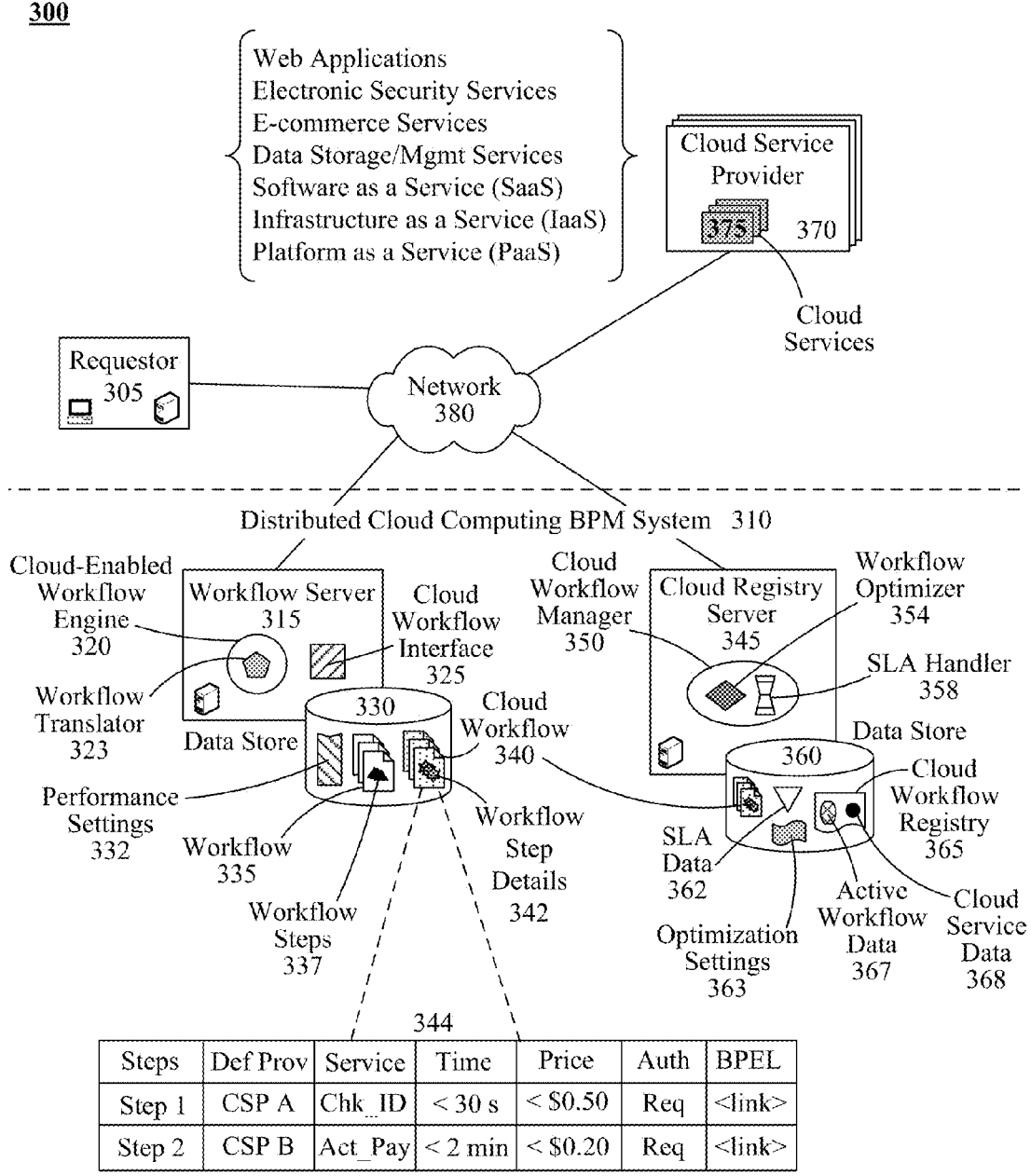
FIG. 3 is a schematic diagram illustrating a system for the dynamic optimization of cloud workflows performed by a distributed cloud computing BPM system in accordance with an embodiment of the inventive arrangements disclosed herein.

FIG. 3 is a schematic diagram illustrating a system 300 for the dynamic optimization of cloud workflows 340 performed by a distributed cloud computing BPM system 310 in accordance with embodiments of the inventive arrangements disclosed herein. System 300 can represent a configuration capable of performing process flow 200 of FIG. 2.

In system 300, a cloud workflow 340 can be dynamically optimized and run in a distributed manner by the distributed cloud computing BPM system 310. A requestor 305 can request performance of a workflow 335 or cloud workflow 340 by the distributed cloud computing BPM system 310 via network 380. Performance of the workflow 335 or cloud workflow 340 can utilize one or more cloud service providers 370. The requestor 305 can correspond to a human user and/or computing entity providing a set of input values for which the workflow 335 or cloud workflow 340 is to be performed.

It should be noted that network 380 can include one or more computing networks local to the requestor 305 in addition to network elements that comprise the infrastructure of the cloud computing environment and/or Internet. For example, the requestor 305 and the distributed cloud computing BPM system 310 can be connected to a network 380 internal to the organization, while the cloud service providers 370 can exist upon servers of other businesses that are accessible over the Internet 380.

A cloud service provider 370 can represent a computing entity configured to provide one of more cloud services 375. A cloud service 375 can represent a wide variety of network 380 accessible software and/or hardware elements, including, but not limited to, computer servers, virtual servers, database storage, electronic file storage, Web applications, electronic communication services, E-commerce services, software applications, and the like.

The distributed cloud computing BPM system 310 can represent the hardware and/or software components required to perform the cloud workflow 340 representations of workflows 335. The distributed cloud computing BPM system 310 can include a variety of components arranged in numerous configurations (i.e., distributed, grid, etc.) that can be used to perform cloud workflow 340 functions in addition to and/or in lieu of typical workflow 335 functions.

Components of particular note to this embodiment of the present invention can include a workflow server 315 and a cloud registry server 345. The cloud-enabled workflow engine 320 of the workflow server 315 and the cloud workflow manager 350 of the cloud registry server 345 can work together to distribute the performance of a cloud workflow 340 by cloud service providers 370 in a cloud computing environment, as illustrated in process flow 200 of FIG. 2.

The workflow server 315 can represent the hardware and/or software components of the distributed cloud computing BPM system 310 configured to handle the performance of workflows 335 and/or cloud workflows 340 using a cloud-enabled workflow engine 320. The workflow server 315 can include a cloud-enabled workflow engine 320, a cloud workflow interface 325, and a data store 330 containing performance settings 332, workflows 335, and cloud workflows 340.

The cloud-enabled workflow engine 320 can represent a workflow engine that has been configured to handle performance of a cloud workflow 340. The cloud-enabled workflow engine 320 can also be configured to operate as a standard workflow engine (i.e., internal service providers only), instantiating a workflow 335, not a cloud workflow 340, when indicated. In one embodiment, each workflow engine 320 can be in charge of deciding which workflow 340 task(s) are assigned to which service providers 370.

Thus, it is possible for the cloud-enabled workflow engine 320 to receive requests from requestors 305 that reference either a workflow 335 or a cloud workflow 340. A workflow 335 can represent a typical electronic representation of a business process used by current BPM systems. A workflow 335 can be written in a business process execution language (BPEL) and include multiple workflow steps 337, each defining operating parameters.

A cloud workflow 340 can be an abstract representation of a workflow 335 specifically written to be performed by the cloud-enabled workflow engine 320 and cloud service providers 370. The cloud workflow 340 can be written in a specialized cloud BPEL that can be standardized for use across various cloud service providers 370, cloud services 375, and/or cloud-enabled workflow engines 320.

Allowing requestors 305 to request or reference workflows 335 can save time by not having to modify each invocation of a workflow 335 to reference a cloud workflow 340 instead. This also decouples the requestor's 305 call to run a workflow 335 from how the workflow 335 is run by the distributed cloud computing BPM system 310. That is, the requestor 305 does not need to "know" if the requested workflow 335 should be run as a cloud workflow 340 or not.

The performance settings 332 can be used to indicate to the cloud-enabled workflow engine 320 when a received request for a workflow 335 should be performed as a cloud workflow 340. The performance settings 332 can represent user-configurable operating parameters of the cloud-enabled workflow engine 320. The performance settings 332 can include settings typically associated with the performance of workflows 335 as well as settings specific to cloud workflows 340. For example, a performance setting 332 can specify that workflow A 335 should not be performed as a cloud workflow 340 or define a default time limit for performing a specific service or cloud service 370.

When a requested workflow 335 is to be performed as a cloud workflow 340, the cloud-enabled workflow engine 320 can check the data store 330 for an existing cloud workflow 340 that represents the requested workflow 335. Should a cloud workflow 340 not exist for the requested workflow 335 or is outdated, the cloud-enabled workflow engine 320 can use the workflow translator 323 to create a corresponding cloud workflow 340.

The workflow translator 323 can be a software component of the cloud-enabled workflow engine 320 configured to create a cloud workflow 340 from an existing workflow 335 and data captured in the performance settings 332. Each workflow step 337 of the workflow 335 can be translated into a corresponding workflow step detail 342 in the cloud workflow 340.

Table 344 can illustrate some of the information that can be captured in a cloud workflow 340. As shown in table 344, Step 1 of the cloud workflow 340 is for a "Check ID" service with cloud service provider A 370 as a default provider. The time to perform Step 1 should be less than 30 seconds and should cost less than 50 cents. Authorization is required by the requestor 305 when changing providers. Additionally, a link to the BPEL of the corresponding workflow step 337 in the workflow 335 can also be included.

It should be noted that the information presented in table 344 is to illustrate the type of information that can be captured within the cloud workflow 340 and is not meant to represent cloud BPEL encoding of such information.

A cloud workflow interface 325 can be used to create and/or modify cloud workflows 340 and/or performance settings 332. The cloud workflow interface 325 can be a graphical user interface providing an interaction mechanism for the distributed cloud computing BPM system 310. The cloud workflow interface 325 can be accessed by a human user via the workflow server 315 or a client device (not shown) connected via network 380.

Once the cloud-enabled workflow engine 320 has retrieved or created the cloud workflow 340 for the requested workflow 335, the cloud workflow 340 can be sent to the cloud registry server 345 for distribution to cloud service providers 370 and optimization. The cloud registry server 345 can represent the component of the distributed cloud computing BPM system 310 that interfaces with the cloud service providers 370 in the cloud computing environment.

In one embodiment, the cloud registry server 345 can include cloud workflow manager 350, and a data store 360 containing copies of cloud workflows 340, service-level agreement (SLA) data 362, optimization settings 363, and a cloud workflow registry 365. The cloud workflow manager 350 can represent an optional software application running on the cloud registry server 345 that is configured to conduct the various tasks necessary to coordinate performance the cloud workflow 340 by various cloud service providers 370. Tasks performed by the cloud workflow manager 350 can include, but are not limited to, handling message traffic, encoding/decoding message data, dynamically optimizing performance of cloud workflows 340, compiling cloud service data 368, determining current identifiers for cloud service providers 370 and/or cloud services 375, managing service-level agreements (SLAs), and the like.

Upon receipt of a cloud workflow 340 from the cloud-enabled workflow engine 320, the cloud workflow manager 350 can register the cloud workflow 340 in the cloud workflow registry 365. The cloud workflow registry 365 can represent a local repository of data related to performance of the cloud workflow 340 within the cloud computing environment. The cloud workflow registry 365 can include active workflow data 367 and cloud service data 368.

Registration of a received cloud workflow 340 can include the addition of the cloud workflow 340 to the active workflow data 367 of the cloud workflow registry 365 and storage of the cloud workflow 340 in the data store 360. Upon completion, the cloud workflow 340 can be removed from the data store 360 and/or active workflow data 367.

After registration, the cloud workflow manager 350 can begin performance and optimization of the cloud workflow 340. Optimization of the cloud workflow 340 can be performed by the workflow optimizer 354 component of the cloud workflow manager 350. The workflow optimizer 354 can be a software application and/or algorithm configured to determine which cloud service providers 370 to use to perform the cloud workflow 340 under the current operating conditions.

To make this determination, the workflow optimizer 354 can utilize the information contained in the cloud workflow 340, optimization settings 363, and cloud service data 368. The optimization settings 363 can capture user preferences pertaining to how the cloud workflow 340 is to be optimized by the workflow optimization handler 355. For example, an optimization setting 363 can specify that use of cloud services 375 from cloud service provider A 370 are automatically authorized or that price is a higher priority than time.

The cloud service data 368 can represent a collection of relevant information about the operating conditions of cloud services 375. For example, the cloud service data 368 can include the current processing time and price for a specific cloud service 375 performed by a specific cloud service provider 370.

The cloud services 375 and/or cloud service providers 370 included in the cloud service data 368 can vary depending on the specific implementation and/or design of the distributed cloud computing BPM system 310. For example, the cloud service data 368 may only include information about for a predefined set of cloud services 375 and/or cloud service providers 370. Alternately, information can be stored in the cloud service data 368 based upon the cloud services 375 and/or cloud service providers 370 that have been previously used by the distributed cloud computing BPM system 310.

Since the information contained in the cloud service data 368 can be time-sensitive, the workflow optimizer 354 can be configured to assess the recentness of the cloud service data 368 prior to use. Should the cloud service data 368 be considered outdated, the workflow optimizer 354 can request updated information from the cloud service provider 370. Due to the dynamic nature of the cloud computing environment, the cloud registry server 345 can be configured to refresh the cloud service data 368 at predetermined time intervals.

In another embodiment, a listener component (not shown) can operate from the cloud service providers 370 for the purpose of providing cloud service data 368 to the cloud registry server 345.

In yet another embodiment, the cloud service providers 370 can detect or be informed of the initiation of a cloud workflow 340 by the cloud workflow manager 350. The cloud service providers 370 can then provide the workflow optimizer 354 with cloud service data 368 regarding workflow step details 342 for which they can improve the performance. Such an embodiment can be coupled with the previously-described embodiment using a listener component operating from the cloud service providers 370.

It should be emphasized that the workflow optimizer 354 optimizes the cloud workflow 340 based upon the real-time or near real-time operating conditions of the cloud service providers 370 within the cloud computing environment. Conventional BPM systems do not support such a capability when interacting with a cloud computing environment.

When the workflow optimizer 354 selects a cloud service provider 370 during the optimization process, the SLA handler 358 can be required to address the establishment of a SLA. The SLA handler 358 can be software component configured to enact and/or dissolve SLAs between the distributed cloud computing BPM system 310 and the cloud service provider 370. Actions taken by the SLA handler 358 can be recorded as SLA data 362 within the data store 360.

Further, optimizations to the cloud workflow 340 can also require authorization of the cloud-enabled workflow engine 320. Authorization for changes can be determined based on stored performance settings 332 and/or input from the requestor 305.

The cloud workflow manager 350 can then distribute the workflow step details 342 of the cloud workflow 340 to the appropriate cloud service providers 370. In addition to the workflow step details 342, the cloud workflow manager 350 can inform each cloud service provider 370 where to deliver the generated output and/or where to expect to receive input. Thus, intermediary data generated by the performance of the cloud workflow 340 can travel linearly without extra distribution steps needed by the cloud workflow manager 350.

Once performance of the cloud workflow 340 is complete, the cloud workflow manager 350 can receive the final output and convey the output to either the cloud-enabled workflow engine 320 or directly to the requestor 305.

Network 380 can include any hardware/software/and firmware necessary to convey data encoded within carrier waves. Data can be contained within analog or digital signals and conveyed though data or voice channels. Network 380 can include local components and data pathways necessary for communications to be exchanged among computing device components and between integrated device components and peripheral devices. Network 380 can also include network equipment, such as routers, data lines, hubs, and intermediary servers which together form a data network, such as the Internet. Network 380 can also include circuit-based communication components and mobile communication components, such as telephony switches, modems, cellular communication towers, and the like. Network 380 can include line based and/or wireless communication pathways.

As used herein, presented data stores 330 and 360 can be a physical or virtual storage space configured to store digital information. Data stores 330 and 360 can be physically implemented within any type of hardware including, but not limited to, a magnetic disk, an optical disk, a semiconductor memory, a digitally encoded plastic memory, a holographic memory, or any other recording medium. Data stores 330 and 360 can be a stand-alone storage unit as well as a storage unit formed from a plurality of physical devices. Additionally, information can be stored within data stores 330 and 360 in a variety of manners. For example, information can be stored within a database structure or can be stored within one or more files of a file storage system, where each file may or may not be indexed for information searching purposes. Further, data stores 330 and 360 can utilize one or more encryption mechanisms to protect stored information from unauthorized access.

Figure 4:
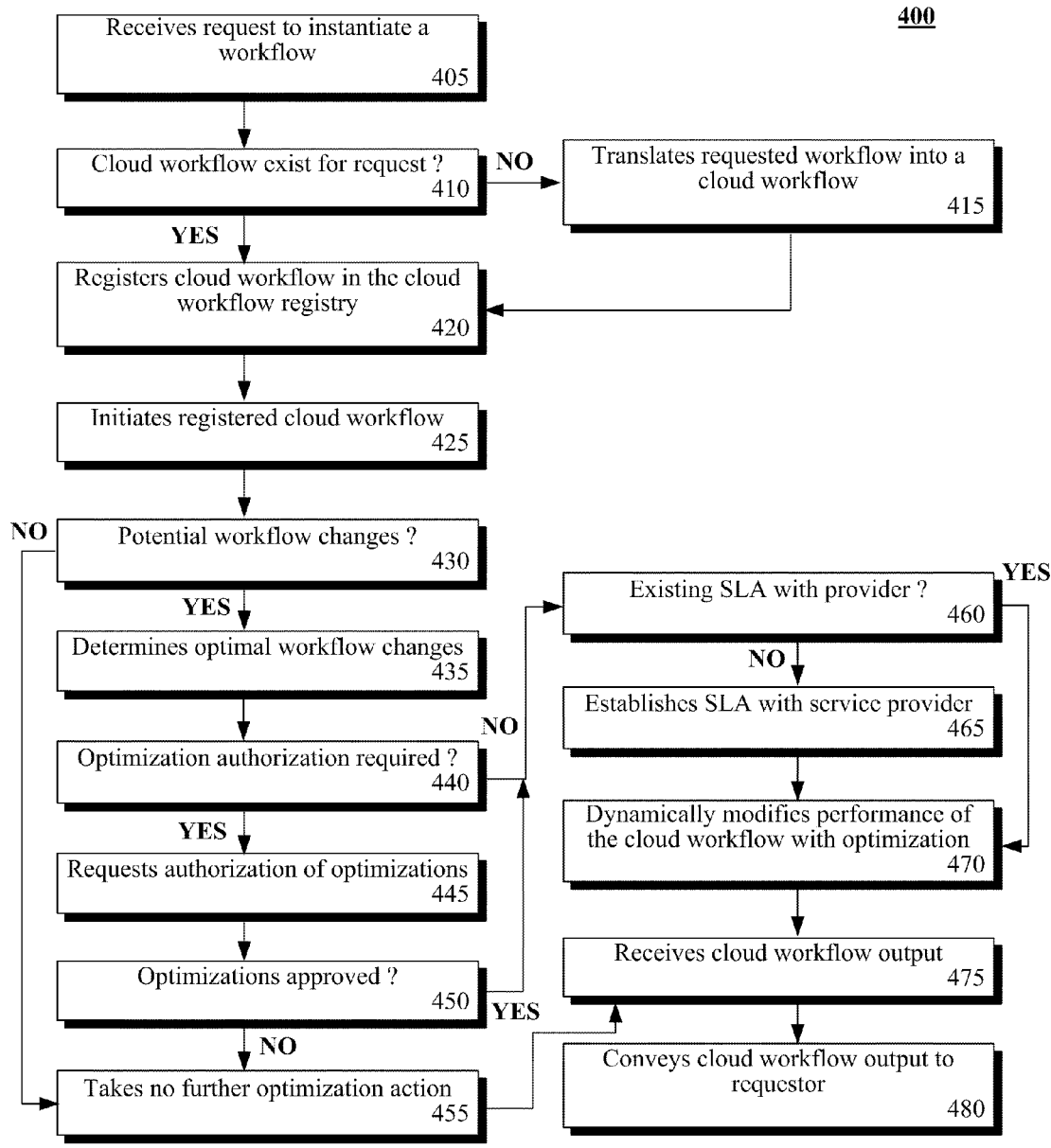
FIG. 4 is a flow chart of a method 400 describing the basic operation of a distributed cloud computing BPM system in accordance with embodiments of the inventive arrangements disclosed herein.

FIG. 4 is a flow chart of a method 400 describing the basic operation of a distributed cloud computing BPM system in accordance with embodiments of the inventive arrangements disclosed herein. Method 400 can be performed within the context of system 300 and/or process flow 200 of FIG. 2.

Method 400 can begin in step 405 where the distributed cloud computing BPM system can receive a request to instantiate a workflow. The existence of a cloud workflow for the request can be determined in step 410. When a cloud workflow does not exist, step 415 can be performed where the requested workflow can be translated into a cloud workflow. Step 415 can be performed using the workflow translator and performance settings of the distributed cloud computing BPM system.

Upon completion of step 415 or when a cloud workflow already exists, the cloud workflow can be registered in the cloud workflow registry in step 420. In step 425, the registered cloud workflow can be initiated.

Potential workflow changes can be identified in step 430. The potential workflow changes of step 430 can be identified by the workflow optimizer or received from individual cloud service providers, depending upon the implementation of the distributed cloud computing BPM system.

When potential changes do not exist for the cloud workflow, flow of method 400 can proceed to step 455 where no further optimization action is taken by the distributed cloud computing BPM system. When there are potential changes for the cloud workflow, the optimal changes to the cloud workflow can be determined in step 435. Performance of step 435 can utilize the optimization settings of the distributed cloud computing BPM system.

It should be noted that in step 435 an optimal change can be determined for each step of the cloud workflow. That is, based upon the potential changes available, step 435 can determine the optimal change for each step of the cloud workflow from that set. Also, determination of an optimal change can include comparing the cloud service data for the potential change with the cloud service data for a default cloud service provider.

In step 440, it can be determined if authorization is required to enact an optimization determined in step 435. When authorization is required, step 445 can be performed, requesting authorization for the optimizations. This request can be sent to the cloud-enabled workflow engine for initial handling based upon the stored performance settings. If unable to handle the authorization request, the cloud-enabled workflow engine can forward the authorization request to the original requestor.

In step 450, the approval of the optimizations can be determined. When the optimizations are not approved, the distributed cloud computing BPM system can take no further optimization action in step 455. The cloud workflow then completes processing the request, and can return output to the requestor, as indicated by proceeding from step 455 to step 475.

When one or more optimizations are approved, step 460 can be performed where the existence of a service-level agreement (SLA) with the selected cloud service provider can be determined. When a SLA does not already exist with the cloud service provider, a SLA can be established with the cloud service provider in step 465. Upon establishment of the SLA or when a SLA already exists, step 470 can be performed where the performance of the cloud workflow can be dynamically modified to utilize the optimization. The cloud workflow can then be processed in accordance with the optimizations, which generates cloud workflow output. This output can be received by the distributed cloud computing BPM system in step 475. In step 480, the cloud workflow output can be conveyed to the workflow requestor.

Figure 5:
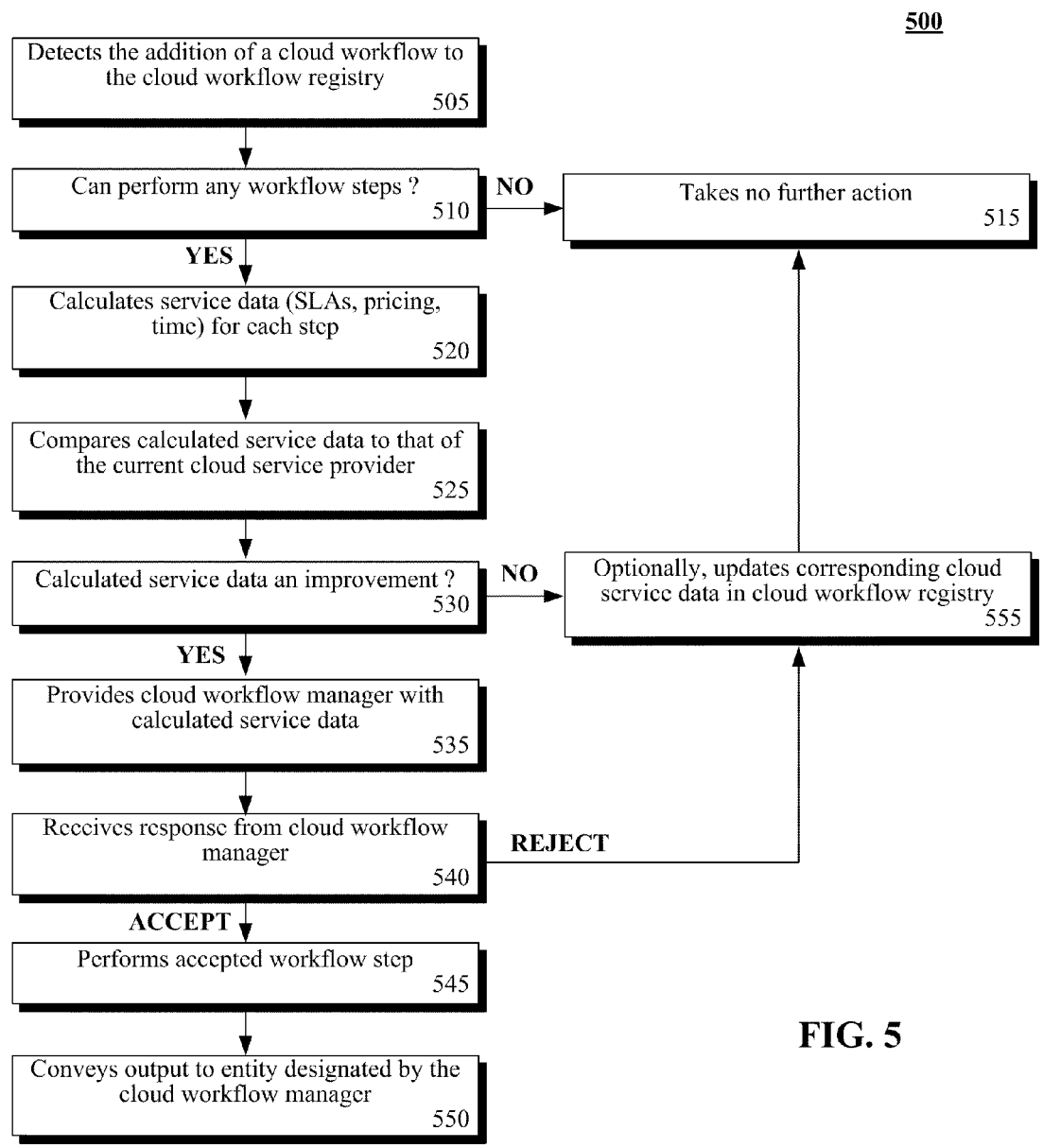
FIG. 5 is a flow chart of a method describing the identification of cloud workflow optimizations by a cloud service provider in accordance with embodiments of the inventive arrangements disclosed herein.

FIG. 5 is a flow chart of a method 500 describing the identification of cloud workflow optimizations by a cloud service provider in accordance with embodiments of the inventive arrangements disclosed herein. Method 500 can be performed within the context of system 300 and/or in conjunction with method 400.

Method 500 can begin in step 505 where the cloud service provider can detect the addition of a cloud workflow to the cloud workflow registry. Alternately, the cloud service provider can receive this information as a broadcast message from the distributed cloud computing BPM system.

It can be determined if the cloud service provider can perform any of the workflow steps of the new cloud workflow in step 510. Performance of step 510 can assume that the cloud service provider has some level of access to the information contained within the cloud workflow registry.

When the cloud service provider cannot perform any steps of the cloud workflow, flow of method 500 can proceed to step 515 where no further action is taken. When the cloud service provider can perform one or more steps of the cloud workflow, service data, such as time and price, can be calculated for those steps in step 520.

In step 525, the calculated service data can be compared to the service data of the currently-selected cloud service provider. It can be determined in step 530 if the calculated service data is an improvement over the service data of the currently-selected cloud service provider.

When the calculated service data is not an improvement, flow can proceed to step 555 where the cloud service provider can optionally update their corresponding cloud service data for the service in the cloud workflow registry. From step 555, step 515 can be performed where no further action is taken.

When the calculated service data is an improvement, the cloud service provider can provide the cloud workflow manager with the calculated service data in step 535. In step 540, a response can be received from the cloud workflow manager.

When the response from the cloud workflow manager is one of rejection, flow can proceed to step 555 followed by step 515 where the service provider can optionally update their corresponding cloud service data for the service in the cloud workflow registry and then take no further action.

When the response from the cloud workflow manager is one of acceptance, step 545 can be performed where the cloud service provider can perform the accepted workflow step. The output can then be conveyed to the entity designated by the cloud workflow manager in step 550.

Figure 6:
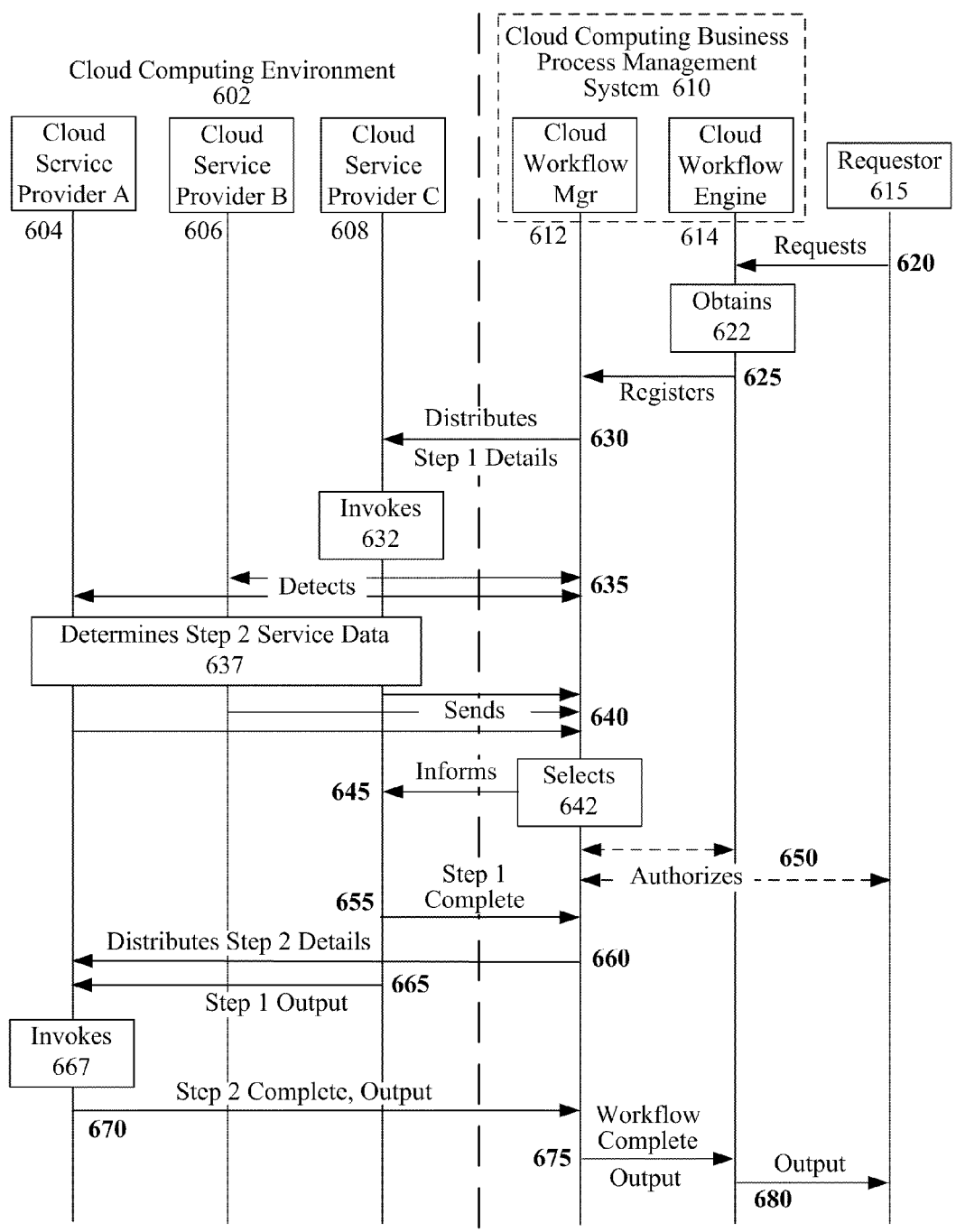
FIG. 6 is an interaction diagram illustrating the communications between entities involved in the performance of a cloud workflow by a distributed cloud computing BPM system in accordance with embodiments of the inventive arrangements disclosed herein.

FIG. 6 is an interaction diagram 600 illustrating the communications between entities 604, 606, 608, 612, 614, and 615 involved in the performance of an example cloud workflow by a distributed cloud computing BPM system 610 in accordance with embodiments of the inventive arrangements disclosed herein. Interaction diagram 600 can be performed within the context of system 300 and/or in conjunction with methods 400 and/or 500.

The communications illustrated in interaction diagram 600 can occur between cloud service providers A 604, B 606, and C 608, a cloud workflow manager 612 and cloud workflow engine 614 of a distributed cloud computing BPM system 610, and a requestor 615. Cloud service providers A 604, B 606, and C 608 can operate within a cloud computing environment 602. In one embodiment, environment 602 can include a collection of different environments, each having an environment specific framework. For example, a service of provider A 604 can be implemented as an AMAZON ELASTIC COMPUTE CLOUD (EC2) service in an EC2 environment; a service for provider B 606 can be implemented as a GOOGLE APP ENGINE service; and, a service for provider C 608 can be implemented as a MICROSOFT AZURE PLATFORM service.

As shown in diagram 600, the example cloud workflow can include two steps. The first step can be designated to be performed by cloud service provider C. A specific cloud service provider 604, 606, or 608 can be unspecified for the second step.

Interaction between these entities can begin when the requestor 615 requests 620 the performance of the example cloud workflow by the distributed cloud computing BPM system 610. The request 620 from the requestor 615 can be received by the cloud workflow engine 614.

The cloud workflow engine 614 can then obtain 622 the requested cloud workflow, either directly or through the translation of an existing workflow document. The cloud workflow engine 614 can then register 625 the cloud workflow with the cloud workflow manager 612.

Since cloud service provider C 608 is specified for Step 1, the cloud workflow manager 612 can distribute 630 the workflow step details to cloud service provider C 608. Cloud service provider C 608 can then invoke 632 the requested service.

While Step 1 is being performed by cloud service provider C 608, cloud service providers A 604 and B 606 can detect 635 the initiation of the cloud workflow. All the cloud service providers A 604, B 606, and C 608 can determine 637 their respectively service data for Step 2. Each cloud service provider A 604, B 606, and C 608 can send 640 their determined Step 2 service data to the cloud workflow manager 612.

The cloud workflow manager 612 can then select 642 a cloud service provider A 604, B 606, or C 608 to perform Step 2. For this example, cloud service provider A 604 is selected to perform Step 2. After selection, cloud service provider C 608 can be informed 645 where to deliver the output of Step 1. Authorization 650 for using the selected cloud service provider A 604 can be performed, if necessary.

Upon completion of Step 1, cloud service provider C 608 can notify 655 the cloud workflow manager 612. The cloud workflow manager 612 can then distribute 660 the Step 2 details to cloud service provider A 604. Cloud service provider C 608 can send 665 the Step 1 output to cloud service provider A 604.

Cloud service provider A 604 can then invoke 667 the appropriate service. Upon completion of Step 2, cloud service provider A 604 can send 670 the cloud workflow manager 612 notification of completion and the output of Step 2.

The cloud workflow manager 612 can inform 675 the cloud workflow engine 614 that performance of the cloud workflow is complete and provide the output. The cloud workflow engine 614 can then convey 680 the output to the requestor 615.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A software method for dealing with service provider competition within business process flows comprising:

receiving, at a workflow server comprising software running on hardware, a request from an originator for a business process workflow conforming to a business process model, wherein the business process workflow comprises a plurality of different tasks with interdependencies among the different tasks, which by the interdependencies some of the different tasks are able to be executed in parallel and others must be executed in series upon completion of other ones of the different tasks, wherein the originator comprises software running on hardware and wherein the originator is remotely located from the workflow server;

responsive to the request, the workflow server assigning the plurality of different tasks to a plurality of different software services provided by different service providers, where each task has a corresponding one of the different software services that completes the corresponding one of the different tasks, wherein each of the different service providers comprises software running on hardware;

the workflow server establishing a workflow document defining the plurality of different tasks, the corresponding ones of the software services, an allocated cost per software service, and a time allocation per software service for completing the corresponding one of the different tasks;

providing at least a portion of the workflow document to the different service providers, wherein each of the different service providers is provided with details for at least one of the different tasks that was not initially assigned by the workflow server;

the different service providers bidding on at least a one of the different tasks that were not initially assigned to them;

wherein at least a portion of the different service providers determines an ability to perform at least one of the different tasks of the business process flows in a more efficient manner than a service provider of the different service providers which was initially assigned that task by the workflow server, wherein the more efficient manner means that the one of the different tasks will be performed in either a shorter time frame or lower cost than that determined by the workflow server;

responsive to the bidding, at least one of the different service providers winning a bid to provide an uncompleted one of the different tasks;

responsive to determining the ability to perform at least one of the different tasks, modifying the business process flow to substitute at least one of the plurality of different tasks with a more efficient task as determined by at least one of the different service providers;

updating the workflow document to reflect the uncompleted one of the different tasks is to be completed in accordance with the bid of a winning service provider of the different service providers that won the bid when the originator approves the change to the workflow document;

executing at the different service providers the business process flow in accordance with the modifications that include at least one substituted and more efficient task than that originally determined by the workflow server or executing at the different service providers the business process flow in accordance with the unmodified workflow when the originator does not approve the changes to the workflow document; and completing the workflow in accordance with the workflow document as updated.

2. The software method of claim 1, further comprising:

the workflow server storing the workflow document in a cloud registry, which each of the different service providers have access to, wherein the updating of the workflow document occurs within the cloud registry.

3. The software method of claim 1, further comprising:
each of the different service providers receiving a copy of the workflow document from the workflow server, wherein bids from the different service providers are submitted back to the workflow server for approval, wherein when the workflow server determines that one of the different service providers has won a bid, the workflow server updates the workflow document accordingly, and the workflow server conveys the workflow document as updated to at least a portion of the different service.

4. The software method of claim 1, wherein bids from the different service providers are submitted back to the workflow server for approval, wherein prior to modifying the business process flow to substitute at least one of the plurality of different tasks with a more efficient task as determined by at least one of the service providers the workflow server requests approval from the originator to make a change responsive to at least one of the bids, said method further comprising:
when the originator approves the change, the workflow server approving the change and updating the workflow document accordingly; and
when the originator does not approve the change, the workflow server not approving the change so that the workflow document remains unmodified by the change which was not approved and continuing to accept bids from other different service providers.

5. The software method of claim 1, further comprising:
at least a portion of the service providers being approved to automatically update the workflow document responsive to having a more efficient bid on a task, wherein the winning and updating is performed directly by one of the service providers without activities being required of the workflow server.

6. The software method of claim 1, wherein the workflow document is written in a cloud business process execution language, which is a standardized business process execution language (BPEL) language, which is independent of and functional across a plurality of different cloud computing platforms.

7. The software method of claim 1, wherein each of the software services is a cloud service, wherein each of the service providers is remotely located from the workflow server and is operated and owned by an entity independent of the entity that operates and owns the workflow server.

8. A non-transitory computer readable medium for dealing with service provider competition within business process flows comprising instructions for:
receiving, at a workflow server comprising software running on hardware, a request from an originator for a business process workflow conforming to a business process model, wherein the business process workflow comprises a plurality of different tasks with interdependencies among the different tasks, which by the interdependencies some of the different tasks are able to be executed in parallel and others must be executed in series upon completion of other ones of the different tasks, wherein the originator comprises software running on hardware and wherein the originator is remotely located from the workflow server;
responsive to the request, the workflow server assigning the plurality of different tasks to a plurality of different software services provided by different service providers, where each task has a corresponding one of the different software services that completes the corresponding one of the different tasks, wherein each of the different service providers comprises software running on hardware;
the workflow server establishing a workflow document defining the plurality of different tasks, the corresponding ones of the software services, an allocated cost per software service, and a time allocation per software service for completing the corresponding one of the different tasks;
providing at least a portion of the workflow document to the different service providers, wherein each of the different service providers is provided with details for at least one of the different tasks that was not initially assigned by the workflow server;
the different service providers bidding on at least a one of the different tasks that were not initially assigned to them;
wherein at least a portion of the different service providers determines an ability to perform at least one of the different tasks of the business process flows in a more efficient manner than a service provider of the different service providers which was initially assigned that task by the workflow server, wherein the more efficient manner means that the one of the different tasks will be performed in either a shorter time frame or lower cost than that determined by the workflow server;
responsive to the bidding, at least one of the different service providers winning a bid to provide an uncompleted one of the different tasks;
responsive to determining the ability to perform at least one of the different tasks, modifying the business process flow to substitute at least one of the plurality of different tasks with a more efficient task as determined by at least one of the different service providers;
updating the workflow document to reflect the uncompleted one of the different tasks is to be completed in accordance with the bid of a winning service provider of the different service providers that won the bid when the originator approves the change to the workflow document;
executing at the different service providers the business process flow in accordance with the modifications that include at least one substituted and more efficient task than that originally determined by the workflow server or executing at the different service providers the business process flow in accordance with the unmodified workflow when the originator does not approve the changes to the workflow document; and
completing the workflow in accordance with the workflow document as updated.

9. A system for dealing with service provider competition within business process flows comprising:
a workflow server configured to:
receive a request from an originator for a business process workflow conforming to a business process model, wherein the business process workflow comprises a plurality of different tasks with interdependencies among the different tasks, which by the interdependencies some of the different tasks are able to be executed in parallel and others must be executed in series upon completion of other ones of the different tasks, wherein the originator comprises software running on hardware and wherein the originator is remotely located from the workflow server;
responsive to the request, the workflow server assign the plurality of different tasks to a plurality of different software services provided by different service providers, where each task has a corresponding one of the different software services that completes the corresponding one of the different tasks, wherein each of the different service providers comprises software running on hardware;

establish a workflow document defining the plurality of different tasks, the corresponding ones of the software services, an allocated cost per software service, and a time allocation per software service for completing the corresponding one of the different tasks;

provide at least a portion of the workflow document to the different service providers, wherein each of the different service providers is provided with details for at least one of the different tasks that was not initially assigned by the workflow server;

the different service providers bidding on at least a one of the different tasks that were not initially assigned to them;

wherein at least a portion of the different service providers determines an ability to perform at least one of the different tasks of the business process flows in a more efficient manner than a service provider of the different service providers which was initially assigned that task by the workflow server, wherein the more efficient manner means that the one of the different tasks will be performed in either a shorter time frame or lower cost than that determined by the workflow server;

responsive to the bidding, at least one of the different service providers winning a bid to provide an uncompleted one of the different tasks;

responsive to determining the ability to perform at least one of the different tasks, modifying the business process flow to substitute at least one of the plurality of different tasks with a more efficient task as determined by at least one of the different service providers;

update the workflow document to reflect the uncompleted one of the different tasks is to be completed in accordance with the bid of a winning service provider of the different service providers that won the bid when the originator approves the change to the workflow document;

execute at the different service providers the business process flow in accordance with the modifications that include at least one substituted and more efficient task than that originally determined by the workflow server or executing at the different service providers the business process flow in accordance with the unmodified workflow when the originator does not approve the changes to the workflow document; and complete the workflow in accordance with the workflow document as updated.

10. The system of claim 9, further comprising:
a cloud registry comprising a tangible storage medium directly accessible by the workflow server and the different service providers, wherein the cloud registry stores a workflow document for each of the business process flows, wherein the workflow document specifies the tasks for each of the business process flows, the corresponding software services and service providers for each of the tasks, the allocated cost per software service, and the time allocation per software service.

11. The system of claim 10, wherein each of the workflow documents of the cloud registry is written in a cloud business process execution language, which is a standardized business process execution language (BPEL) language, which is independent of and functional across a plurality of different cloud computing platforms.

12. The system of claim 9, wherein bids by the different service providers are won when bids indicate that tasks of the business process flow are able to be performed more efficiently than indicated in the workflow document, wherein more efficiently means that the uncompleted one of the tasks will be performed in a shorter time frame, a lower cost, or both a shorter time frame and a lower cost than previously indicated.

* * * * *